US011897729B2

(12) United States Patent
Kattainen et al.

(10) Patent No.: US 11,897,729 B2
(45) Date of Patent: Feb. 13, 2024

(54) METHOD FOR SETTING AN ELEVATOR INTO SERVICE MODE

(71) Applicant: KONE Corporation, Helsinki (FI)

(72) Inventors: Ari Kattainen, Helsinki (FI); Antti Hovi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1403 days.

(21) Appl. No.: 16/273,905

(22) Filed: Feb. 12, 2019

(65) Prior Publication Data

US 2019/0202662 A1 Jul. 4, 2019

Related U.S. Application Data

(63) Continuation of application No. PCT/EP2016/072181, filed on Sep. 19, 2016.

(51) Int. Cl.
*B66B 5/00* (2006.01)
*B66B 1/24* (2006.01)

(52) U.S. Cl.
CPC .......... *B66B 5/0087* (2013.01); *B66B 1/2458* (2013.01); *B66B 2201/406* (2013.01)

(58) Field of Classification Search
CPC ................ B66B 5/0087; B66B 1/2458; B66B 2201/406
See application file for complete search history.

(56) References Cited

U.S. PATENT DOCUMENTS

2008/0047783 A1* 2/2008 Vogl ......................... B66B 5/005 187/314
2015/0158695 A1* 6/2015 Friedli .................. B66B 1/2458 29/401.1
2017/0174474 A1* 6/2017 Aitamurto ............... B66B 5/005

FOREIGN PATENT DOCUMENTS

EP 2623452 A1 * 8/2013 ............. B66B 13/16
WO WO2014/112079 A1 7/2014
WO WO-2014112079 A1 * 7/2014 ........... B66B 5/0087

OTHER PUBLICATIONS

International Search Report for PCT/EP2016/072181 dated Jun. 12, 2017.
Written Opinion of the International Searching Authority for PCT/EP2016/072181 dated Jun. 12, 2017.

* cited by examiner

*Primary Examiner* — Jeffrey Donels
(74) *Attorney, Agent, or Firm* — Birch, Stewart, Kolasch & Birch, LLP

(57) ABSTRACT

A method for taking an elevator of an elevator group into service mode includes entering in the input device of the elevator group a maintenance signal which comprises an elevator definition part, upon entering of the maintenance signal the elevator identified in the elevator definition part is removed from landing call allocation, the identified elevator is initiated to serve all remaining car calls and then to drive to a maintenance floor and to wait there for maintenance operation.

20 Claims, 2 Drawing Sheets

METHOD FOR SETTING AN ELEVATOR INTO SERVICE MODE

CROSS REFERENCE TO RELATED APPLICATIONS

Figure 1:
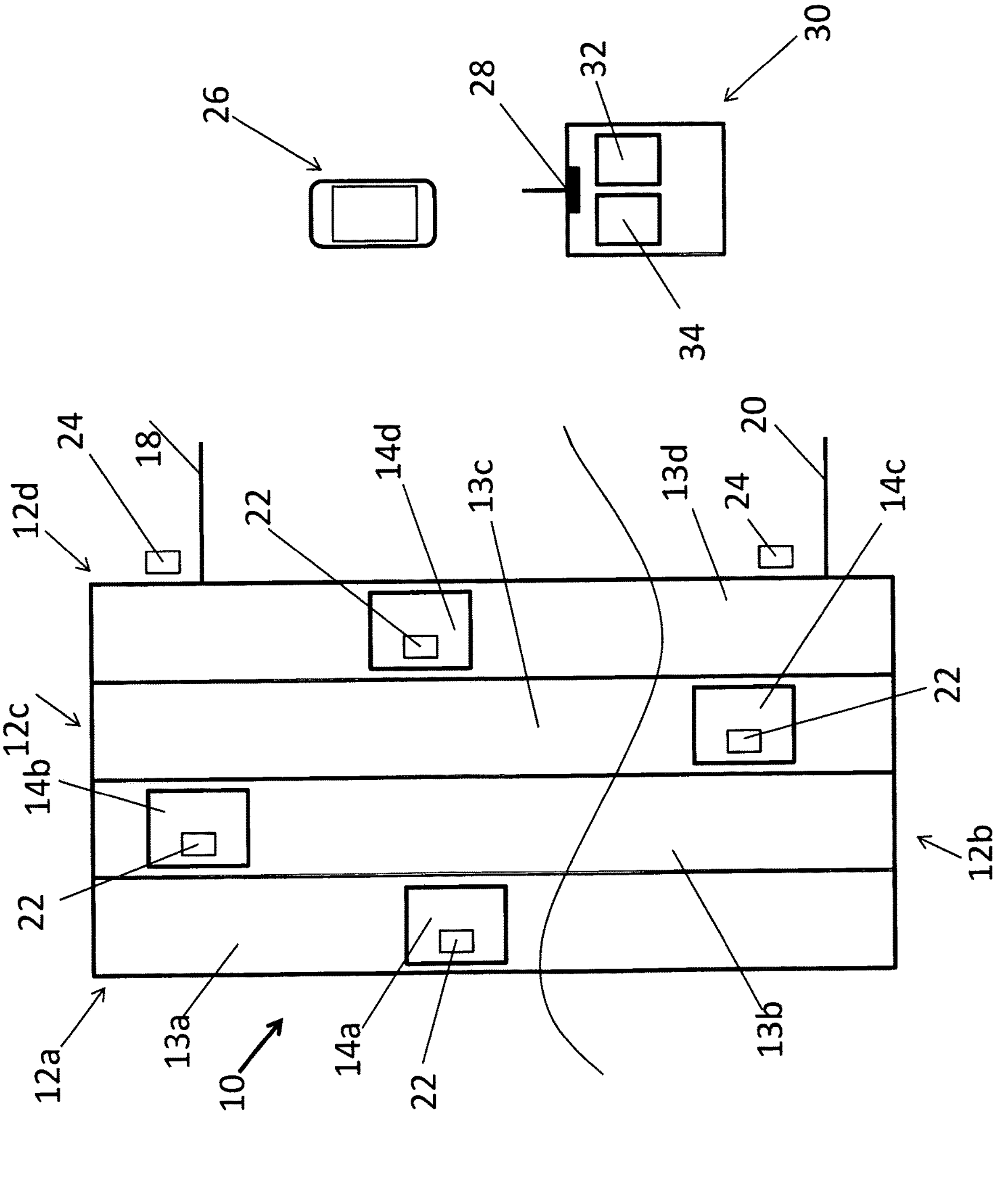

This application is a Continuation of PCT International Application No. PCT/EP2016/072181, filed on Sep. 19, 2016, which is hereby expressly incorporated by reference into the present application.

Well access in an elevator for maintenance purpose happens traditionally so that a service technician gives car call, steps out from the elevator car, let the elevator car close the doors, whereafter the car drives away from the landing. After a short period of time (approx. 1-2 s) the service technician opens the landing door by using an emergency release key (triangle key). The elevator performs an emergency stop when the landing door is opened and now the service technician can access the well.

When elevator is built according to North American ASME A17.1/CSA B44 safety standard, well access happens by using special Hoistway Access Mode, which is described as follows: The service technician uses this operation to gain easy access to the top of the car and hoistway. The operation of the hoistway access is carried out by means of a switch in the car operating panel and switches at the designated floors, normally top and bottom floor. The service technician runs the car to the top landing on automatic operation and places an access request with a keyed switch in the car operation panel. This will move the elevator into the inspection drive mode, keep the doors open and activate a keyed switch at the top floor station. The constant pressure of the switch at the top floor station will bypass the car and hall door lock contacts (only at the top floor) and drive the car with an inspection drive speed and with doors open downward. The access down limit switch limits the distance the car will travel. The bottom floor access station can be operated the same way to gain access to the pit. The bottom floor access up limit switch shall limit the car travel in the up direction to the point where the bottom of the toe guard is even with the hoistway entrance header.

A further method of controlling access to an elevator well, in particular to the ceiling and/or underside of an elevator car is described in the US 2008/0047783 A1. This method includes the steps of switching the elevator control into a service mode which controls the car to travel to a predetermined stop position permitting access, and opening a landing door of the elevator shaft the car is running in. The elevator control is switched into the service mode only if a landing call receiving device is operated in a predetermined identification pattern which differs from a call pattern for calling the elevator.

All above described methods have same disadvantage. It is difficult to take a particular elevator into maintenance service. When a landing call or destination call is given, the elevator arrives to floor in normal mode and there may be passengers inside. In case of an elevator group, the group controller sends any elevator to the landing and not necessarily the particular elevator the service technician wants to maintain.

It is therefore object of the invention to enable an easy an easy shaft access to a desired elevator car of an elevator group. This object is solved with a method according to claim 1 as well as with an elevator according to claim 12. Preferred embodiments of the invention are subject-matter of the dependent claims. Preferred embodiments of the invention are also disclosed in the specification and in the drawings.

According to the invention, the service technician uses any input device, for example a call input device, to input a maintenance signal, e.g. a maintenance code, into the elevator control of the elevator group, which maintenance signal comprises an elevator definition part and advantageously also a floor definition part. Via entering the maintenance signal into the input device the elevator control is informed about the elevator to be put into service mode in the elevator definition part, whereby the floor at which the maintenance is to be performed is either a preset maintenance floor or a maintenance floor identified in the floor definition part. Usually, the maintenance floor is the uppermost floor or the lowermost floor.

After obtaining the maintenance signal via the input device the elevator control sets the elevator identified in the elevator definition part into service mode, which comprises that the elevator is removed from the elevators available for landing call allocation. Furthermore, after service mode has been initiated the elevator is initiated by the elevator control to only serve all remaining car calls and then to drive to the floor which is identified in the floor definition part of the maintenance signal. The elevator car is controlled to wait at this defined floor in service mode, eventually with doors open.

The advantage of the present invention is therefore, that the service technician can use any input device of the elevator as for example floor operation panels, call operation panels, service interfaces or wireless input devices as for example mobile phones to enter the maintenance signal into the elevator control. Advantageously, the maintenance signal also has a maintenance type definition part which informs the elevator control which kind of maintenance is to be performed. If only one type of car maintenance is to be performed, this identification part of the maintenance itself can be left away. Thus, the invention makes easier for service technician, inspector or other authorized person to take a particular elevator of an elevator group out of normal service before entering a service mode of the elevator or accessing the elevator shaft or well.

Accordingly, the service technician has not to wait until the elevator car he wants to maintain is free or available but he is able to enter the elevator car in question into service mode from every point of the elevator group, in case of wireless input devices even from any point of the elevator group's environment. With the input of the maintenance signal, one essential item is that the elevator car is removed from call allocation. This has the advantage that further landing calls are not issued to the elevator in question which is to be maintained. Accordingly, the remaining car calls of the elevator in question can be worked and after the last car call has been serviced, the elevator automatically drives to the floor which is mentioned in the floor definition part of the maintenance signal.

If there is only one floor for the shaft access, the floor identification part of the maintenance signal may be left away.

The floor definition part of the maintenance signal may also be left away if for example the maintenance signal is inputted on an input device which is located in special area, e.g. in the upper part of the building. Accordingly, the floor identification part could be automatically identified by the elevator control according to the current location of the service technician inputting the maintenance signal into the input device. The position of inputting the code in the input device may therefore be used to automatically complete the maintenance signal.

In a preferred embodiment of the invention, a weight sensor is provided in connection with the elevator and the elevator intended for service mode only drives to the identified floor if the weight sensor indicates that the elevator is empty after all car calls have been served. Via this measure it is ensured that passengers are not driven to the floor from where maintenance should be performed.

The maintenance signal can be entered in the input device via push buttons, via a key switch or via wireless input devices as for example mobile devices or mobile phones. Also a mixture of input actions may be used. Thus the service technician may have a key card which automatically inputs the ID of the service technician and eventually a correlated maintenance type, while inputting the elevator and floor ID via a keyboard of an operating panel. This enables a lot of different options for the service technician facilitating his work essentially.

The location of inputting the maintenance signal, i.e. the location of the input device where the maintenance signal is entered, may also be used to automatically enter the elevator definition part so that for example the elevator to be maintained is selected automatically when the input device is linked with said elevator, which means for example a floor operating panel or car operating panel which is environmentally related to the elevator to be maintained.

The invention thus allows the selection of a particular elevator of the elevator group without first accessing a machine room or MAP can be done in many different ways which are described below.

- By giving the maintenance signal as a pin code from a car operating panel of any elevator of the elevator group.
- By using a dedicated access control card within any elevator of the elevator group by pressing a certain button, e.g. the open-button a dedicated number of times.
- By using a dedicated access control card at destination operation panel at a landing and then e.g. inputting the number of the particular elevator by pressing panel buttons in a dedicated way to input the elevator ID of the elevator to be maintained.
- Giving a special command via mobile phone to the elevator control.

The special command and elevator number which was given by one of the above mentioned methods can be routed directly to the particular elevator to be maintained or into the elevator group controller which then sends command to the selected particular elevator. The particular elevator is then set into service mode, the so called 261 mode (landing calls disconnected) serving all the car calls but not taking any new landing calls or destination commands. After all car calls and destination calls are served then elevator drives to the landing where pin code was given and opens its doors so that the service technician can enter the car and activate 'Safe Well Access' which is a routine to obtain a safe well access for the service technician.

The invention makes the work for the service technician easier and more productive. The service technician can take any elevator of the group into maintenance faster without need to access a machine room or a main access panel of the elevator control. Accessing the machine room could be difficult via ladders and in some cases also via roof of the building.

This invention reduces the risk that the service technician, who is in hurry to get elevator in use, opens the landing door of running elevator which have passengers inside. Naturally this is not very comfortable for passengers.

In a preferred embodiment of the invention, the elevator is initiated to wait at the identified floor with open doors so that the service technician can immediately initiate a safe well access routine to enter the elevator shaft, which normally includes the driving of the car away from the landing with reduced speed and open landing doors so that the service technician is able to access the shaft, particularly the bottom or roof area of the elevator car.

While the elevator is waiting with open doors, the car operation panel might be controlled to decline any regular car call which might be given by accidentally entering persons which are not related to the maintenance process. Thus, the car operating panel advantageously also indicates during the service mode on a display of the car operating panel that the current elevator waiting with open doors is in service mode and therefore not available for passenger transport.

The present invention also relates to an elevator group which is configured to perform the above-mentioned method. The elevator group comprises an elevator control, several elevator cars, input devices, e.g. for inputting elevator car calls, which elevator control comprises an operating mode handling part. The operating mode handling part is configured to receive signals from the input devices which signals comprise a maintenance signal comprising an elevator definition part and preferably also a floor definition part and which operating mode handling part is configured upon receiving a maintenance signal to remove the elevator identified in the maintenance signal from landing call allocation and to drive the identified elevator to a preset maintenance floor or to the floor identified in the floor identification part after the car calls issued in the elevator to be maintained are serviced. With respect to the features and advantages it is referred to the above-described inventive method.

Following terms are used as a synonym: well—shaft; landing—floor; maintenance code—maintenance signal; operating panel—Destination operating panel—DOP;

It should be clear for the skilled person that the above mentioned embodiments of the invention can be combined with each other arbitrarily.

Hereinafter, the invention is described with the aid of the schematic drawing. In the drawings, FIG. 1 shows a schematic diagram of an elevator group with different input devices for entering maintenance codes, and FIG. 2 shows the composition of a maintenance code.

The inventive elevator group 10 comprises several elevators 12*a*, 12*b*, 12*c*, 12*d*, each having an elevator car 14*a-d* and corresponding elevator shafts 16*a*-16*d*. Each elevator 12*a*-12*d* has an uppermost floor 18 and a lowermost floor 20. In the elevator cars 14*a*-14*d* car operating panels 22 ae located which usually comprise an input device as a touch-screen or keyboard or card-reader. At the floors of the environment, e.g. building, where the elevator group is installed landing operating panels 24 are located at each floor, preferably in the elevator lobby. Also mobile devices as for example smartphones 26 can be used as an input device in connection with a transmitter 28 of an elevator control 30, which elevator control 30 controls the elevators 12*a*-12*d* of the elevator group 10. The elevator control 30 has a call allocation unit 32 as well as an operating mode handling part 34. The input devices 22, 24, 26 may comprise usual push buttons, touch sensors or a mixture of input devices as for example identity card- or RFID-readers and manual input devices. The invention works as follows:

Upon receipt of a maintenance code inputted by a service technician via a car operating panel 22, a floor operating panel 24 or via his mobile phone 26, the operating mode handling part 34 of the elevator control 30 sets the elevator identified in an elevator definition part of the maintenance code into a service mode. The entering of the identified elevator into service mode comprises the removing of said elevator from call allocation which means that this elevator is removed from the list of available elevators held in the call allocation unit 32 of the elevator control 30. Furthermore, the elevator in question is initiated to serve the remaining unserved car calls and then to drive automatically to a preset maintenance floor or to the maintenance floor identified in the floor definition part of the maintenance code. The elevator is then initiated to stay at this floor either with open or closed doors. If he is initiated to stay there with open doors, the elevator is taken out of service also for car calls so that accidentally bypassing passengers may not use this elevator to get to a different floor. Preferably, on a display of the car operating panel 22, a message can be displayed that the elevator is taken out of use for maintenance purpose. Accordingly, the invention allows the service technician to easily put any elevator of the elevator group into service mode without accessing a certain part of the elevator, for example the machine room or a defined maintenance panel. As the input of the maintenance signal can be performed at any input device, it is not even necessary that the service technician has to enter any of the elevator cars 14 of the elevator group 10. The service technician may then start a safe well access routine to get access to the elevator shaft.

Figure 2:
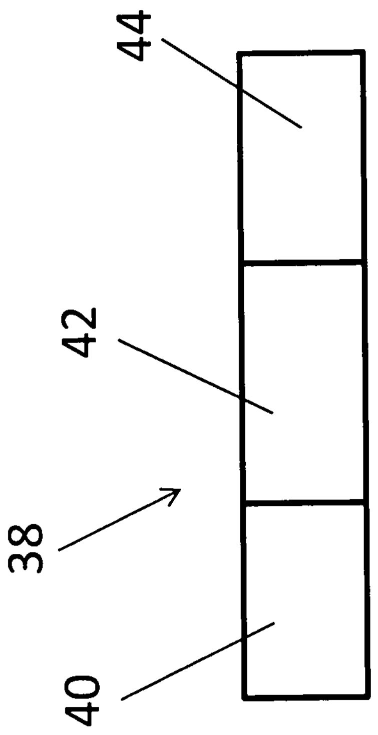

FIG. 2 shows the composition of a maintenance signal 38 comprising a first part 40 defining the type service mode, if there are several. A second part 42 of the maintenance signal defines the elevator (ID) of the elevator group which is to be taken into service mode and an optional third part 44 which defines the maintenance floor at which the maintenance should be performed. This is usually the uppermost or lowermost floor. It is clear that the three parts can be arranged in any desired succession.

It is clear for the skilled person that the above-described embodiments can be combined arbitrarily with each other and that the embodiments are not delimiting the scope of protection which is defined by the appended patent claims.

LIST OF REFERENCE NUMBERS

10 elevator group
12*a-d* elevators of the elevator group
14*a-d* elevator cars of the elevators
16*a-d* elevator shafts of the elevators
18 uppermost floor
20 lowermost floor
22 car operating panel
24 operating panel of landing, e.g. DOP
26 smart phone
28 transmitter
30 elevator control
32 call allocation unit
34 operating mode handling part
38 maintenance signal—maintenance code
40 first optional part of the maintenance signal defining maintenance type
42 second part of the maintenance signal defining elevator to be serviced
44 third optional part of the maintenance signal defining maintenance floor

The invention claimed is:

1. A method for taking an elevator of an elevator group into service mode, comprising a succession of following steps:

entering a maintenance signal in an input device of the elevator group, the maintenance signal comprising an elevator definition part;

upon entering of the maintenance signal, removing the elevator identified in the elevator definition part from landing call allocation; and initiating the identified elevator to serve all remaining car calls and then to drive to a maintenance floor and to wait at the maintenance floor for maintenance operation.

2. The method according to claim 1, wherein a weight sensor is provided in connection with the elevator and the elevator only drives to the identified floor if the weight sensor indicates the elevator to be empty.

3. A method for taking an elevator of an elevator group into service mode, comprising a succession of following steps:

entering a maintenance signal in an input device of the elevator group, the maintenance signal comprising an elevator definition part;

upon entering of the maintenance signal, removing the elevator identified in the elevator definition part from landing call allocation; and initiating the identified elevator to serve all remaining car calls and then to drive to a maintenance floor and to wait at the maintenance floor for maintenance operation wherein the maintenance signal comprises an ID for the maintenance process to be performed.

4. The method according to claim 1, wherein the maintenance signal comprises a floor definition part and the elevator after having serviced the car calls is initiated to drive to the floor identified in the floor definition part.

5. The method according to claim 4, wherein the floor definition part of the maintenance signal is automatically selected depending on the location of the input device where the maintenance signal is entered.

6. The method according to claim 1, wherein the code is entered to an operating panel via push buttons.

7. The method according to claim 1, wherein the code is entered to an operating panel via an access card and via push buttons of the operating panel.

8. The method according to claim 1, wherein the code is entered to the elevator via a mobile device.

9. The method according to claim 1, A method for taking an elevator of an elevator group into service mode, comprising a succession of following steps:

entering a maintenance signal in an input device of the elevator group, the maintenance signal comprising an elevator definition part;

upon entering of the maintenance signal, removing the elevator identified in the elevator definition part from landing call allocation; and initiating the identified elevator to serve all remaining car calls and then to drive to a maintenance floor and to wait at the maintenance floor for maintenance operation, wherein the floor definition part comprises two alternatives, the two alternativedalternatives comprising the top floor and the bottom floor.

10. The method according to claim 1, wherein the elevator definition part of the maintenance signal is automatically selected depending on the location where the code is entered.

11. The method according to claim 1, wherein the elevator is initiated to wait at the identified floor with open doors.

12. The method according to claim 11, wherein the car operating panel (COP) is controlled to decline any regular car calls.

13. An elevator group configured to perform the method according to claim 1, the elevator group comprising an elevator control, several elevator cars, input devices for inputting elevator calls, the elevator control comprising an operating mode handling part, wherein the operating mode handling part is configured to receive a maintenance signal inputted by any input device of the elevator group, the maintenance signal comprising an elevator definition part, and wherein the operating mode handling part is configured, upon receiving a maintenance signal, to remove the elevator identified in the maintenance signal from landing call allocation and to drive the identified elevator to a maintenance floor.

14. The elevator group according to claim 13, wherein the maintenance signal comprises a floor definition part and the operating mode handling part is configured to drive the identified elevator to the floor identified in the floor definition part.

15. The elevator group according to claim 13, wherein the operating mode handling part is configured to have the elevator stop at the maintenance floor and to wait at the maintenance floor.

16. The method according to claim 1, wherein the code is entered to the elevator via a mobile phone.

17. The elevator group according to claim 13, wherein the operating mode handling part is configured to have the elevator stop at the maintenance floor and to wait at the maintenance floor with open doors.

18. The method according to claim 2, wherein the maintenance signal comprises a floor definition part and the elevator after having serviced the car calls is initiated to drive to the floor identified in the floor definition part.

19. The method according to claim 3, wherein the ID for the maintenance process to be performed includes an ID of a service technician.

20. The method according to claim 3, wherein the ID for the maintenance process to be performed includes a floor ID.

* * * * *